June 27, 1967 E. M. M. CAILLAT 3,328,646

PLUG-IN SYSTEM FOR DETACHABLE ELEMENTS

Filed Dec. 6, 1965 5 Sheets-Sheet 1

Inventor:
Edouard Marie Maurice Caillat
BY Baldwin & Wight
Attorneys

June 27, 1967 E. M. M. CAILLAT 3,328,646

PLUG-IN SYSTEM FOR DETACHABLE ELEMENTS

Filed Dec. 6, 1965 5 Sheets-Sheet 2

Inventor:
Edouard Marie Maurice Caillat
BY Baldwin & Wight
Attorneys

Inventors:
Edouard Marie Maurice Caillat
BY Baldwin & Wight
Attorneys

June 27, 1967 E. M. M. CAILLAT 3,328,646

PLUG-IN SYSTEM FOR DETACHABLE ELEMENTS

Filed Dec. 6, 1965 5 Sheets-Sheet 4

Inventor:
Edouard Marie Maurice Caillat
BY Baldwin & Wight
Attorneys

Inventor:
Edouard Marie Maurice Caillat
BY Baldwin & Wight
Attorneys 3,328,646

PLUG-IN SYSTEM FOR DETACHABLE ELEMENTS

Edouard Marie Maurice Caillat, Boulogne-sur-Seine, France, assignor to Societe Industrielle Bull-General Electric (Societe Anonyme), Paris, France Filed Dec. 6, 1965, Ser. No. 511,659
Claims priority, application France, Jan. 26, 1965, 3,345
8 Claims. (Cl. 317—101)

The present invention relates to a plug-in system for detachable elements comprising electric or electronic components. The plug-in system according to the invention finds its main application when the said components are miniaturised in order to occupy minimum volume. At present, this requirement constitutes one of the problems of the design of electronic computers and of certain apparatus in the telecommunications field.

Hitherto, a detachable element of this type has taken the form of a card bearing printed circuits, on which are mounted the components necessary to form any appropriate functional unit. Generally, one of the four sides of this card of rectangular form comprises a series of male contact elements, which are intended to be plugged into corresponding female contact elements provided on an appropriate fixed support. It may be stated that, in order to introduce a card, the plug-in movement is carried out in a direction substantially parallel to the thin plate constituting the printed-circuit card.

A problem arises when the use of microminiaturised components or of integrated circuits makes it possible to concentrate the latter on a printed-circuit card of relatively moderate dimensions.

As compared with the surface of this card, it is necessary to provide an increased number of electrical connections with the outside, and this is naturally done by way of plug-in contacts. Now, the dimensions of the latter, as also their spacing, cannot be reduced below certain limits. The difficulty could be avoided by adopting a printed-circuit card whose length is much greater than its width, but other problems might arise from the viewpoint of mechanical rigidity, cooling, etc.

The fundamental idea on which the invention is based is to dispose two rows of plug-in contact elements on two opposed sides of the rectangular plate of the printed-circuit card, whereby it is possible to double the number of possible connections to the outside. It is readily apparent that the plug-in contacts can no longer be parallel to the plane of the card, or panel of components, but rather perpendicular to the said plane, if it is desired to avoid costly complications.

In accordance with the invention, therefore, the plug-in system comprises an element for the mounting of detachable elements comprising electrical contact members, permitting the insertion (and extraction) of a detachable element, in fact a generally flat panel of components, in a first direction (insertion direction), and the plugging (and unplugging) of this panel in a plugging direction perpendicular to the first direction.

More precisely, in accordance with the invention, the fixed assembly element comprises two parallel, for example vertical, insulating walls and at least one pair of uprights, each symmetrically secured to one wall, each upright comprising a series of horizontally secured flat male contact members, as also a slide disposed on the inside face of the upright and provided with a vertical edge bent over at a right-angle, each panel of components comprising, fixed towards the opposed vertical sides, two longitudinal members formed with recesses for receiving contact clips, each longitudinal member having in its inside face a groove to receive one bent-over edge of a slide, and means with at least two pins fast with each upright co-operating with oblique slots in the said slides, so arranged that, after vertical introduction of a panel of components, the oblique, but generally vertical displacement of one slide produces the horizontal displacement of a corresponding side of the panel and the plugging of its contact clips onto the male contacts of the upright concerned.

The slides are manually operated and, by reason of the particular structure of the male and female contact members, they may be actuated simultaneously or non-simultaneously.

It will be obvious that the adjectives "vertical" and "horizontal" are not used in an absolute sense, their use in the foregoing corresponding to a preferred embodiment, but not the only possible one.

The features of the invention and the manner in which it is put into practice will become more clearly apparent from the following description, with reference to the accompanying drawings, in which.

Figure 1:
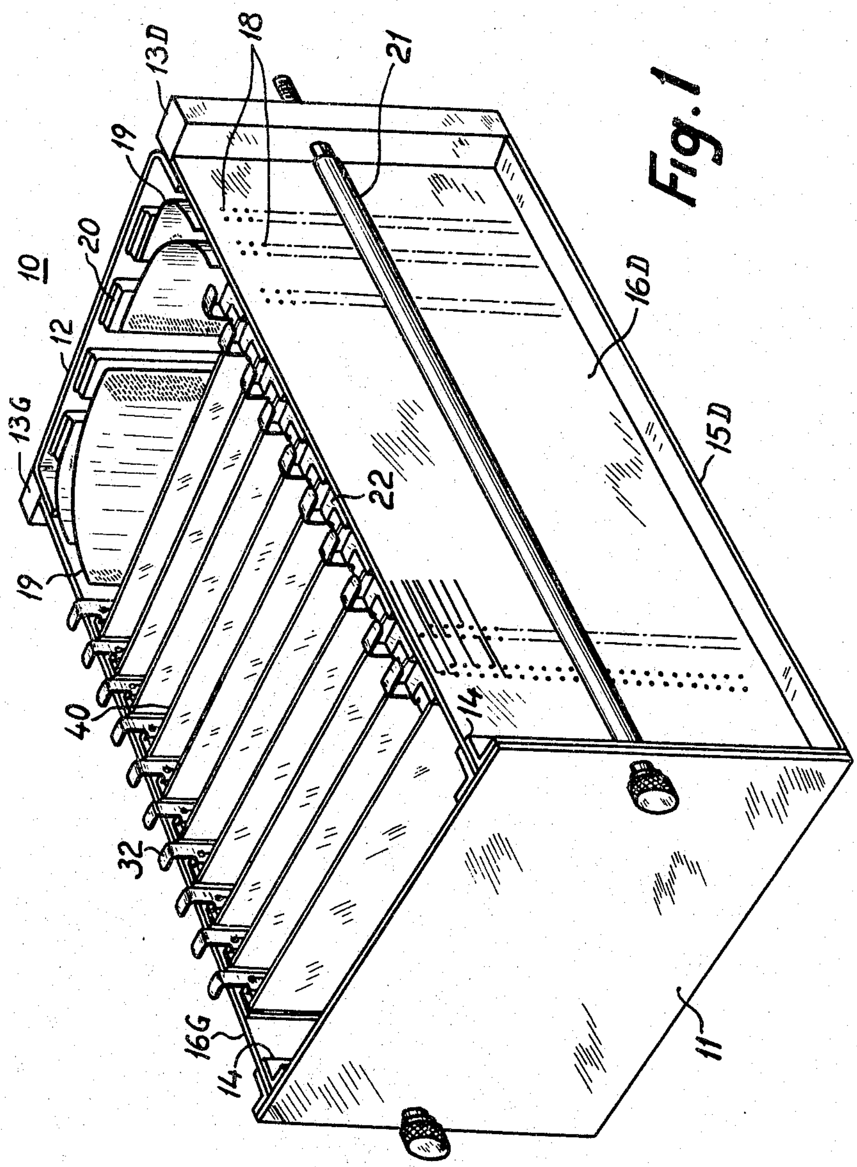
FIGURE 1 is a view in perspective of a so-called "card drawer" assembly according to the invention.

In accordance with standard practice, a receptacle is provided to contain a plurality of panels of electric components. This assembly, which will be called a "card drawer," is denoted by the reference 10 in FIGURE 1. It is composed of a metal skeleton, which comprises a front plate 11, a rear plate 12, two blocks 13D, 13G, four angle irons 14, and two lower angle plates 15D, 15G. All these members form a rigid unit after having been assembled by any usual method, such as bolting, riveting, etc. The card drawer also comprises two walls 16D, 16G, each of which consists of a thin rectangular plate of electrically insulating material based upon resin, such as glass-epoxide. The thickness of these walls may be 1.5 mm., for example. It is desirable for the spacing between the inside faces of the walls always to be the same, even if the thickness of the walls differs. For this reason, they are secured at the rear to the bent-over edges of the rear plate 12, and at the front to the inside angle irons 14, the spacing of which must be determined and fixed once for all.

Figure 2:
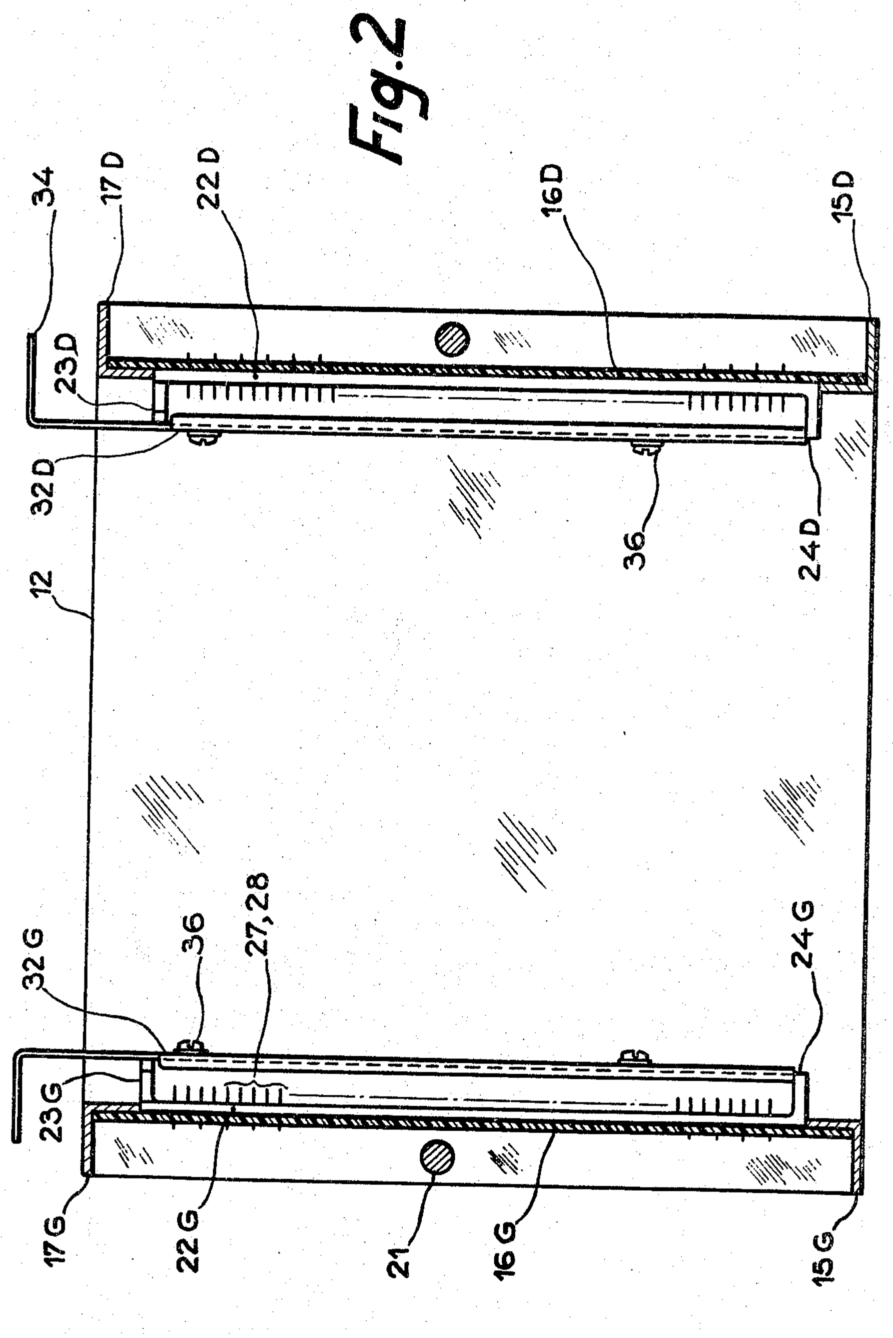
FIGURE 2 is a transverse sectional view through the card drawer, the panels of components having been removed.

FIGURE 2 is a transverse sectional view of the card drawer. It will be seen that the metal skeleton comprises in addition two upper angle plates 17D, 17G. The wall 16D, for example, extends between the sides of the angle plates 15D and 17D, to which it is permanently secured by any appropriate means, such as screws, rivets, etc. It will be noted that the upper angle plates 17D, 17G have not been shown in FIGURE 1, as if the card drawer were cut off below these angle plates, the object of this being to enable the upper portions of the card drawer to be more clearly visible.

The outside face of each of the walls 16D, 16G (FIGURE 1) supports printed circuits which make the desired connections between connecting lugs extending through series of holes in the walls, as will be explained in greater detail in the following. These connections lead to connecting lugs distributed in vertical rows such as 18. From these points, the connections are continued by circuits secured on flexible strips such as 19 and lead to four connectors 20 secured to the rear plate 12.

The card drawer is secured in the apparatus by two locking rods 21. Each locking rod 21 comprises a screw-threaded end separated by a shoulder from the body of the rod, which is of larger diameter. The length of the body of the rod is such that the drawer is maintained in position by the shoulder of the rod supporting the block 13D or 13G.

Figures 3, 4A, 4B:
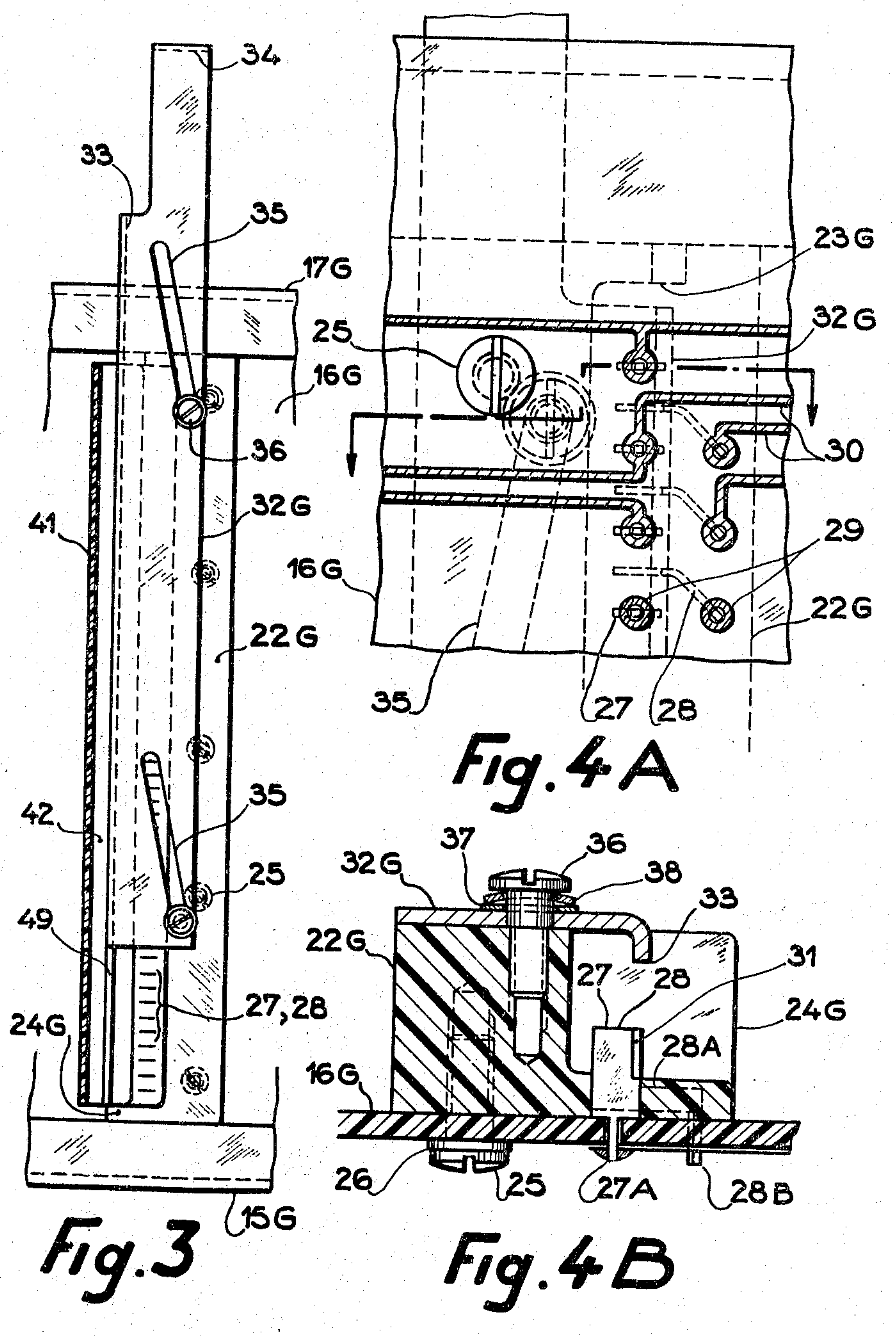
FIGURE 3 is a view in section along the axis of the card drawer, which is intended to show a slide in the uppermost position, and a panel of components before the plugging-in of the contacts.
FIGURES 4A and 4B are, respectively, an external view of an upright and a section therethrough, drawn to an enlarged scale.

Since it is intended to mount ten panels of components 40 in the card drawer, each of the walls 16D, 16G supports ten uprights 22D, 22G, which are more clearly visible in FIGURES 2, 3, 4A and 4B. The cross-section of an upright 22G is shown in FIGURE 4B. This cross-section extends between the upper flanges 23D, 23G, and the lower flanges 24D, 24G, constituting the ends of the uprights. Each upright 22 is secured to the wall 16 by five screws 25, with the interposition of insulating washers 26 (FIGURE 4B). Each upright consists of a mouldable resin-based material of the "Bakelite" type, loaded with mica. A number of male contact elements are positioned at the time of the moulding of each upright (see FIGURES 4A and 4B). There are two types of male contacts. A contact 27 consists of a rectangular blade terminated by a stem 27A. A contact 28 comprises a rectangular blade and an intermediate portion 28A terminated by a stem 28B. The intermediate portions 28A of the contacts 28 are bent over. It will be seen from FIGURE 4B that each contact blade 27, 28 is provided with symmetrical bevels 31 to facilitate the plugging-in of the contact clips.

If, for example, the spacing of the contact blades 27, 28 is 2.54 mm., the holes 29 drilled in a wall 16G are so positioned as to form squares having sides of 5.08 mm. The arrangement adopted is very useful because it is thereby possible to pass two printed conductors, such as 30, between the metallised tablets surrounding two neighbouring holes 29.

A slide 32D, 32G is disposed on each of the uprights 22D, 22G (see FIGURES 2, 3). Each slide is made of a thin metal sheet, for example of stainless steel, or of steel coated with a protective metal. Each slide comprises over almost its entire length a bent-over edge 33, which faces towards the side of the corresponding upright. The upper portion of each slide is terminated by a lug 34 bent at a right angle. Each slide is formed with two oblique slots 35, the spacing of which is equal to that of cooperating guide means comprising pins 36 screwed to the upright 22G (FIGURE 4B). Since the slide must be able to slide on the inside face of the upright and must be maintained in the uppermost position as shown in FIGURE 3, the gripping action must be resilient. There is therefore provided a flat washer 37 and a resilient washer 38, for example of dished form, between the head of the shouldered pin 36 and the slide 32G.

Each panel of components 40 (FIGURES 5, 6A to 6C) is composed essentially of a plate 41 and of two longitudinal members 42 secured to the plate. The latter, the thickness of which should be scarcely lower than 1 mm., is formed of glass-epoxide and may bear printed circuits on one face or on both faces.

Figure 5:
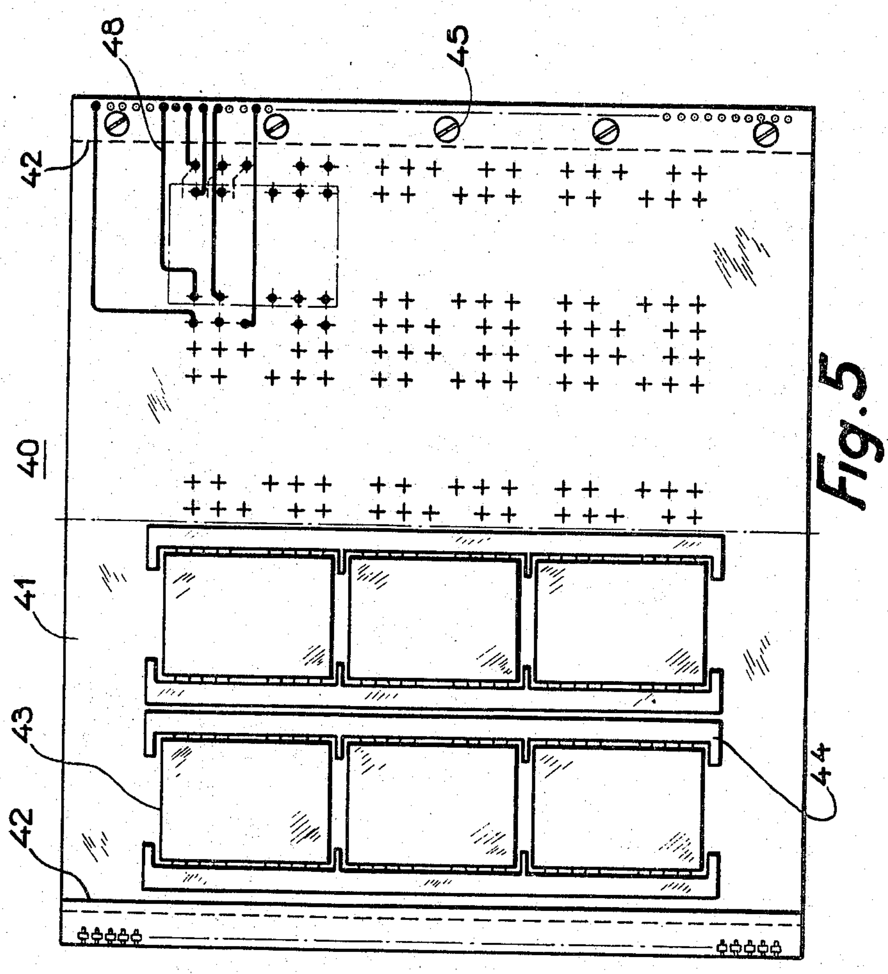
FIGURE 5 is a half-front view and a half-rear view of a panel of components.

In the constructional example under consideration, the plate 41 is intended to serve as a support for a number of modules or modular blocks 43. Each of the latter may be of the type described in the U.S. patent application filed Sept. 15, 1965, Ser. No. 472,253, for "Modular Electric Circuit Package." Each module may contain a functional unit, such as a transistor flip-flop circuit, a group of amplifiers or of logical circuits, etc., depending on the requirements. Each parallelepipedic block is detachable and comprises in each of its larger sides recesses in which are disposed clip-type contact elements. A number of supports 44 for male contact elements are therefore secured to the plate 41. The panel of components illustrated in FIGURE 5 is designed to receive 12 modular blocks, but of course this number may vary in accordance with the dimensions adopted. The stems of the said male contacts extend through holes in the plate 41 and issue on the front face of the latter, as shown in the right-hand part of FIGURE 5. These holes, of which the positions are marked by small crosses, are disposed in squares, for example having sides of 5.08 mm.

The use of plug-in modular blocks is not essential. A construction could equally well be imagined in which the components of the circuits are disposed, like the longitudinal members 42, on the side of the rear face of the plate 41. The ends of their connecting wires would issue on the other face and would be soldered thereon.

Figure 6A:
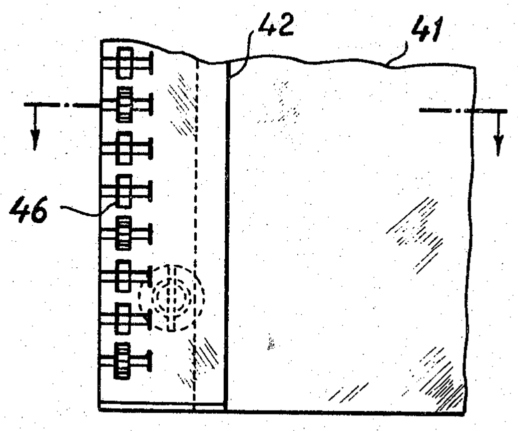
Figure 6B:
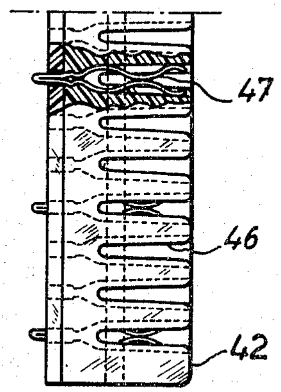
Figure 6C:
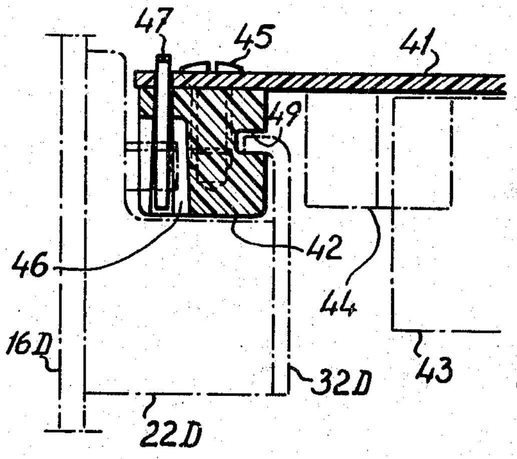

It will be seen from FIGURES 5, 6A and 6C that the longitudinal members 42 are secured by screws 45 to the opposed vertical sides of the plate 41. Each longitudinal member has a substantially square cross-section and is formed with compartments 46 opening on its outside face and on its rear face. Each compartment comprises a recess to receive a contact clip 47, as may be seen from the fragmentary section of FIGURE 6B. A contact clip 47 consists of beryllium bronze heat treated before shaping. For reasons of unification and standardisation, the compartments 46 and the contact clips 47 are completely identical to those of the modular blocks described in the aforesaid patent application.

In prolongation of each compartment 46, the plate 41 is formed with holes, each of which affords passage to the end of a contact clip 47, which end extends beyond the front face of the plate 41. Printed circuits such as 48 (FIGURE 5) are provided which, after tin soldering, enable the desired connections to be made between the stems of the male contacts mounted on the supports 44 and the stems of the contact clips 47 situated in the compartments 46 in the longitudinal members 42. On this front face, the printed circuits extends in a generally horizontal direction. Printed circuits may be provided on the rear face of the plate 41, and they then extend in a generally vertical direction.

The section drawn to an enlarged scale in FIGURE 6C shows the position of a portion of the longitudinal member 42 in relation to the upright 22D, when the contact clips 47 are plugged to the male contact blades. It is obvious that the spacing between the compartments 46 is the same as that between the male contacts. It is therefore advantageous for the uprights 42 also to be made of the resin known as "Bakelite," loaded with mica, in the same way as the uprights 22D, 22G. Each longitudinal member 42 has along the entire length of its inside face a groove 49 serving to receive the bent-over edge 33 of the slide 32D.

Reference will now be made to FIGURE 3. Before a panel of components is introduced into the card drawer, the slides 32D, 32G in the location chosen are raised to their upper position as shown in FIGURE 3. The bent-over edges 33 of the slides are then moved to the maximum distance (towards the front of the drawer and therefore to the left in the drawing) away from the uprights 22D, 22G. A panel of components is introduced by first engaging the lower portions of the grooves 49 in the longitudinal members 42 with the upper portions of the bent-over edges 33 of the slides 32D, 32G. The panel of components, thus guided by the slides, is then lowered until the lower ends of the longitudinal members 42 abut the lower flanges 24D, 24G of the uprights 22D, 22G.

Figure 7:
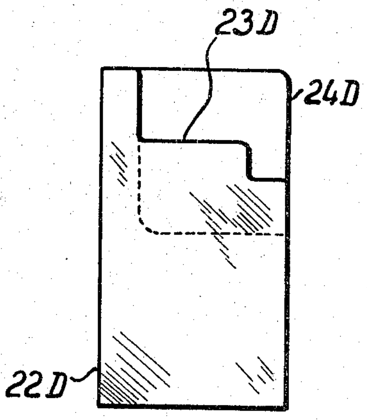

When pressure is applied to the bent-over lugs 34 of the slides, the latter descend with a composite movement resulting from the obliquity of the slots 35, thus bearing against the pins 36. During this time, the bent-over edges 33 of the slides, which slide in the grooves 49 in the longitudinal members 42, bring the latter towards the uprights 22D, 22G, so that the plugging of the contact clips to the male contact plates is effected. During the horizontal movement imparted to the panel of components, the lower portions of the longitudinal members 42 slide on the upper face of the lower flanges of the uprights 22D, 22G. The free distance between the lower flanges and the upper flanges is scarcely greater than the length of the longitudinal members 42, so that the exact amount of clearance necessary in their horizontal plugging movement is provided. FIGURE 7 shows that these flanges are not of the same shape. While a lower flange 24D is substantially rectangular, the upper flange 23D must be recessed to permit the passage of the longitudinal member 42 and of the bent-over edge 33 of a slide.

When it is desired to extract a panel of components, the slides are pulled into their upper position, which brings about the inverse horizontal movement of the panel of components and the disconnection of the contact clips and of the male contacts. During this movement, the friction would tend to raise the panel of components, but as long as this disconnection has not been affected, the upper portions of the longitudinal members 42 abut the lower faces of the upper flanges 23D, 23G of the uprights, so that the contact elements cannot be damaged.

It is to be noted that, although preferable, the simultaneous disconnection of the two sides of a panel of components is not essential. Owing to the fact that the male contact blades on the two sides are horizontal, the panel of components can oscillate about a vertical axis extending through the contacts situated on one side if only the slide belonging to the other side is raised. Obviously, all that remains essential is that the two slides must both be in their uppermost position in order that a panel of components may be introduced or withdrawn.

In one embodiment, the extent of the horizontal movement for plugging-in a panel of components was 6 mm. The spacing of the neighbouring uprights 22D, 22G on the walls 16D, 16G, on the other hand, was such as to leave an additional clearance of 2 mm., which is useful for the ready introduction of the panels of components. The resulting spacing between the latter, however, is not unnecessary, because it serves for the passage of the ventilated air for the cooling of the circuit elements.

Figure 8:
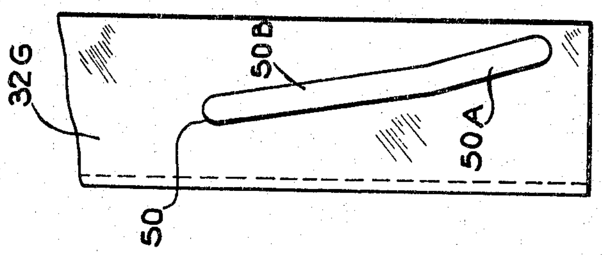
FIGURES 6A, 6B, 6C, 7 and 8 are different views of constructional details.

FIGURE 8 shows a variant relating to the shape of the oblique slots in the slides 32D, 32G. Since the horizontal displacement of a panel of components is composed of an approach phase and of a plug-in phase proper, a slot 50 may be formed of two non-aligned portions. For example, the portion 50A extending over one third of the height corresponds to the approach phase. It may extend at a larger angle in relation to the vertical than the slot 35 in FIGURE 3. On the other hand, the portion 50B may be at a smaller angle than the said slot 35, so as to reduce the force which must be exerted on the slide at the time of the plugging-in of the contacts.

The construction of the plug-in system as just described combines economy with efficiency. The advantages of this construction are due to a large extent to the structure and the arrangement of the contact elements. Not only do the latter enjoy a self-cleaning friction, but they do not require to be absolutely accurately positioned, except in regard to their spacing, which must be precise with a view to interchangeability.

I claim:

1. A plug-in system for detachable elements bearing electric components comprising: a receptacle provided with two parallel walls, on each of which there is provided a plurality of uprights of insulating material which are mounted in pairs of two symmetrical uprights, each upright supporting a plurality of flat contact elements so spaced and arranged that the contact elements of two uprights of one pair are in common parallel planes, a plurality of actuating slides, each adapted to co-operate with the inside face of an upright and each comprising a bent-over edge extending towards the associated upright, and at least two camming slots, guide means secured to the inside face of each of the uprights to cooperate with the camming slots of the associated slide in order to define the displacement of this slide between two extreme positions, so that in a first position the bent-over edge of the slide is distant from the upright and in the second position the bent-over edge is close to the upright, and a plurality of panels of components, each panel being provided with two parallel longitudinal members secured to the opposed sides of a thin insulating plate, each longitudinal member having in its inside face a groove corresponding to the bent-over edge of a slide, and each longitudinal member comprising a number of spaced compartments in which there are secured contact elements which are perpendicular to the said plate and arranged to engage with the contact elements of the said uprights when the slides of the pair of corresponding uprights are in the said second position.

2. A plug-in system according to claim 1, wherein each of the contact elements secured in the said uprights is a flat male element adapted to engage in a corresponding female contact element secured in a compartment in a longitudinal member of the said panel of components.

3. A plug-in system according to claim 2, wherein each vertically disposed upright has a lower flange serving as a vertical stop for the lower end of a said longitudinal member when a panel of components is introduced into the receptacle after the guiding of the grooves of the longitudinal members on the bent-over edges of two slides.

4. A plug-in system according to claim 3, wherein each upright has an upper flange forming a vertical stop for the upper end of a said longitudinal member when the slides are actuated so as to be brought from their second position to their first position.

5. A plug-in system for fitting a number of panels of electric components into a receptacle comprising two vertical walls of insulating material, the said system comprising: a number of pairs of symmetrical uprights, the uprights of one pair each being vertically secured to one of the said walls, each upright supporting a plurality of superposed male contact elements, each contact element being flat and horizontal, a number of pairs of flat slides, each having a vertical right-angled rib and at least two inclined slots which are guided by two pins secured to one vertical plane face of an upright, so that a slide may occupy two extreme upper and lower positions in which the said right-angled rib is distant from and close to the upright, respectively, and a number of panels of components, each of which panels is composed of two vertical longitudinal members secured to the opposed sides of a thin insulating plate, each longitudinal member having in one inside face a vertical groove serving to receive the right-angled rib of a slide, and each longitudinal member comprising an equal number of spaced compartments in which there are enclosed female contact clip elements in positions corresponding to the said male contact elements, so that the said female contacts are engaged on the male contacts when the slides of one pair are brought into their lower position and the female contacts are disengaged from the male contacts when the slides are brought into their upper position.

6. A plug-in system according to claim 5, wherein each of the said uprights has a lower flange serving as a vertical stop for the lower end of a said longitudinal member when a panel of components is introduced into the receptacle after the guiding of the grooves of the longitudinal members on the right-angle ribs of two slides.

7. A plug-in system according to claim 6, wherein each upright has an upper flange forming a vertical stop for the upper end of a said longitudinal member when the slides are actuated so as to be brought from their lower position to their upper position.

8. A plug-in system according to claim 7, wherein a resilient washer is disposed between the head of a pin and the slide, so that the latter can slide, while being able to remain in its upper position.

No references cited.

ROBERT K. SCHAEFER, *Primary Examiner*.

J. R. SCOTT, *Assistant Examiner*.